Sept. 29, 1931.     W. A. FRISBY     1,825,183
TOURIST'S OUTFIT
Filed Jan. 3, 1930     4 Sheets-Sheet 1
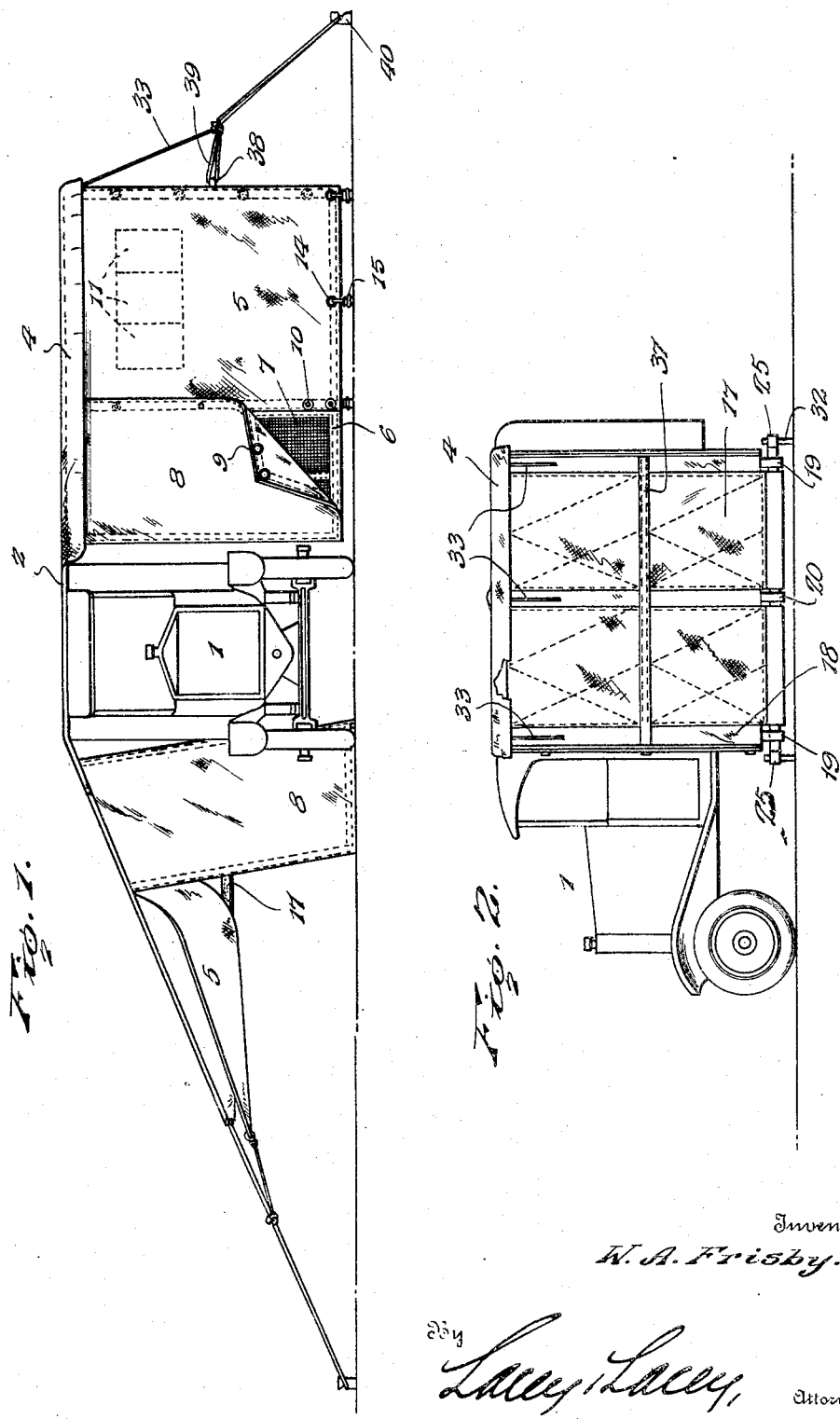

Sept. 29, 1931.   W. A. FRISBY   1,825,183
TOURIST'S OUTFIT
Filed Jan. 3, 1930    4 Sheets-Sheet 2
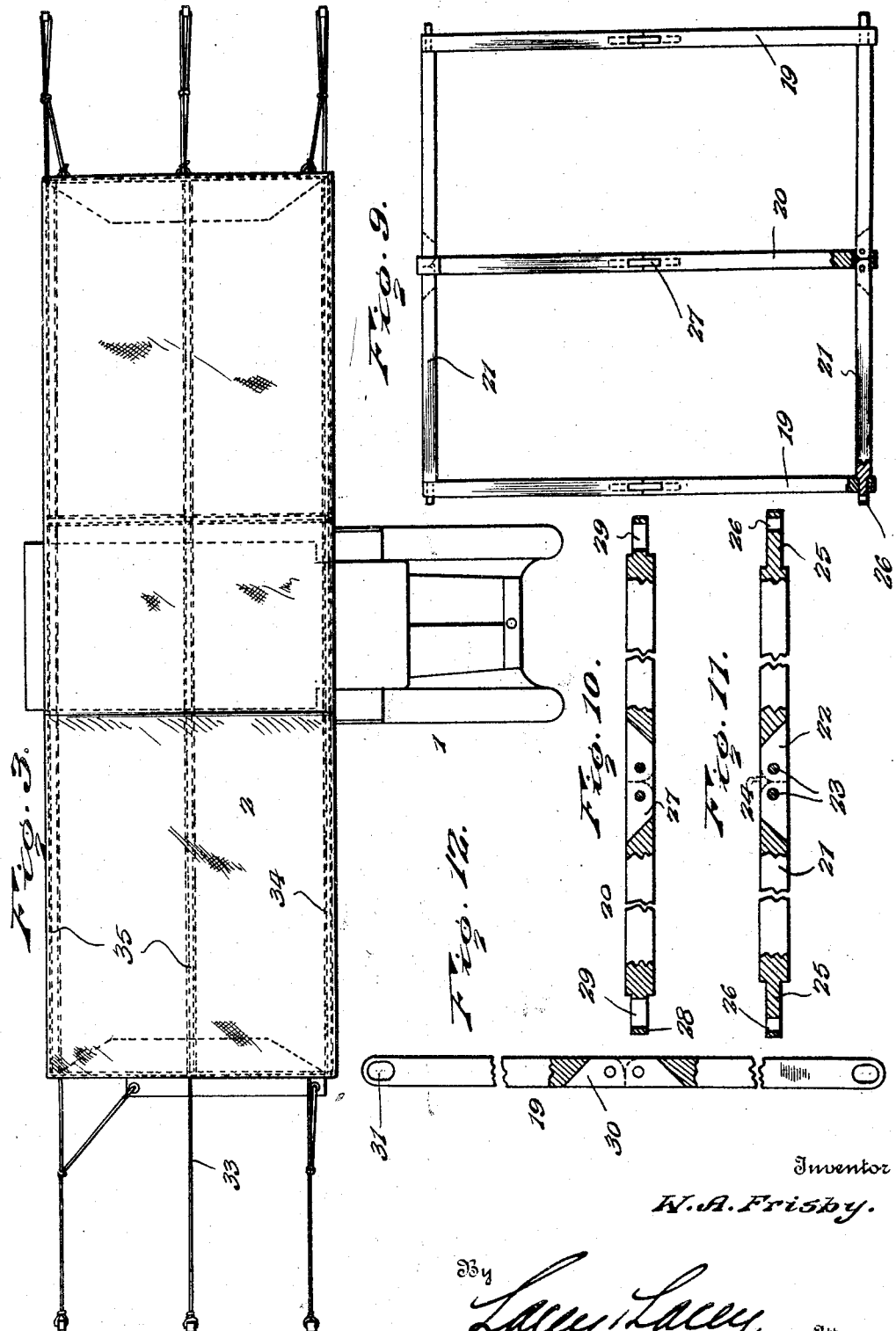
Inventor
W. A. Frisby.
By Lacey & Lacey, Attorneys Sept. 29, 1931.  W. A. FRISBY  1,825,183
TOURIST'S OUTFIT
Filed Jan. 3, 1930   4 Sheets-Sheet 3
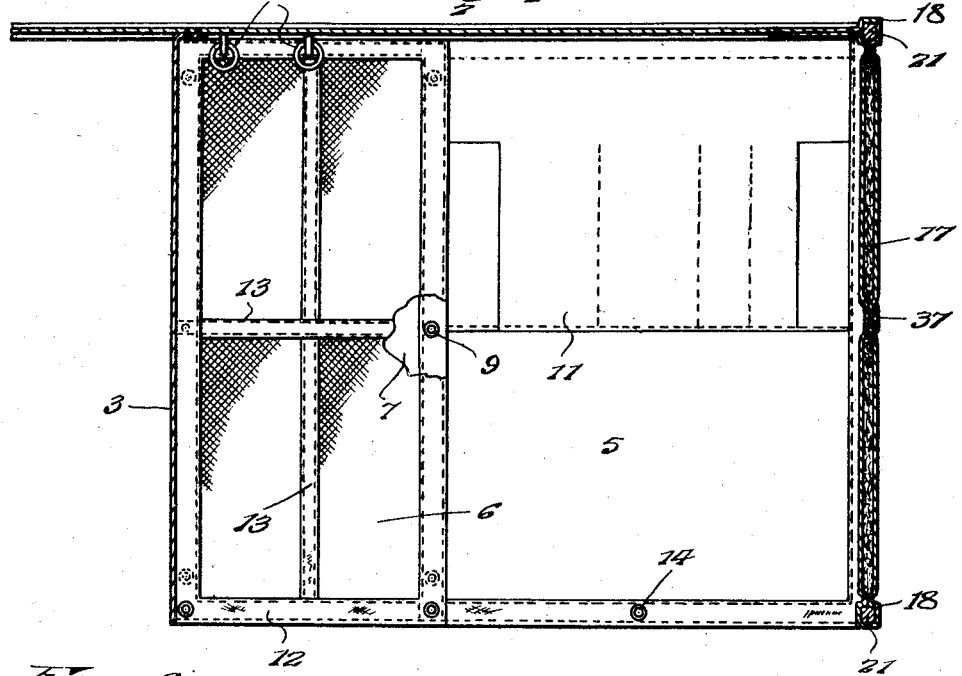
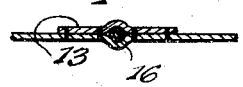
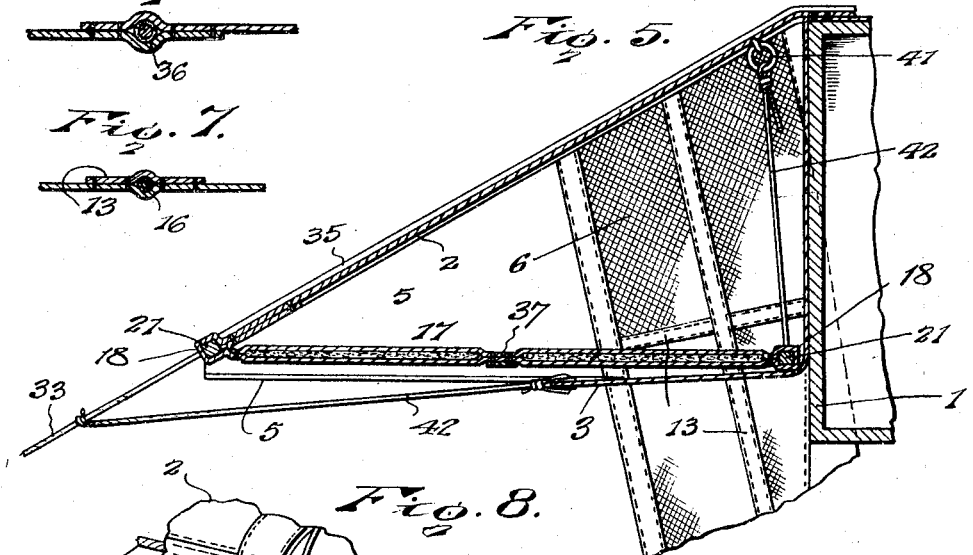
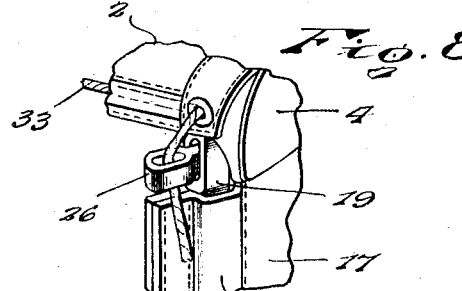

Sept. 29, 1931.   W. A. FRISBY   1,825,183
TOURIST'S OUTFIT
Filed Jan. 3, 1930   4 Sheets-Sheet 4
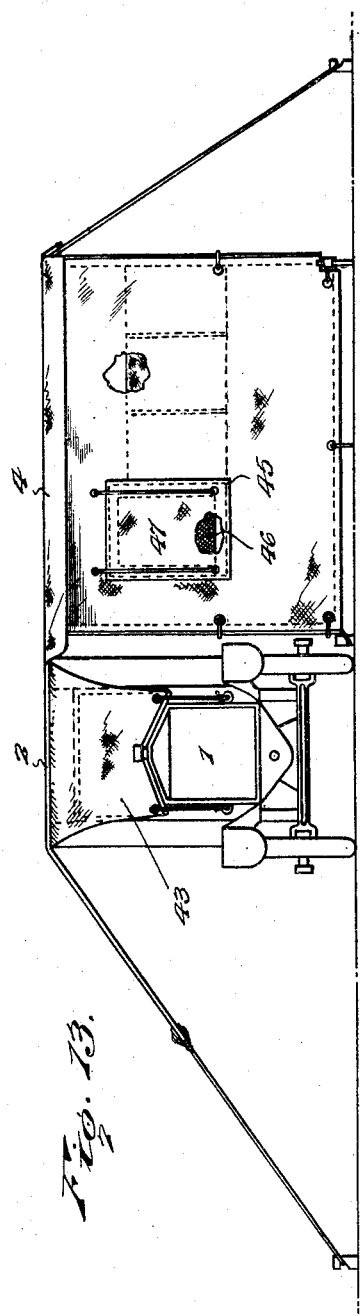
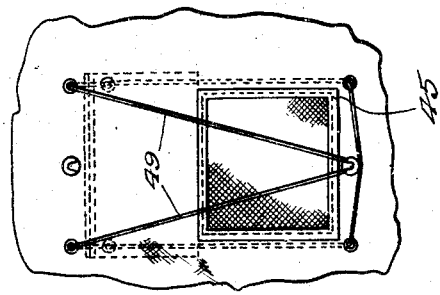
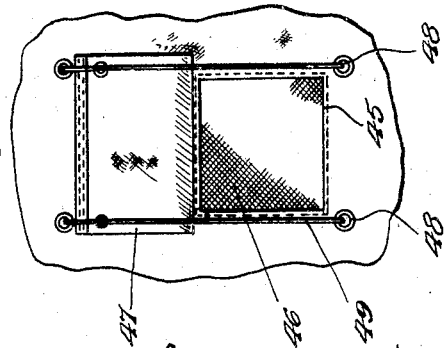
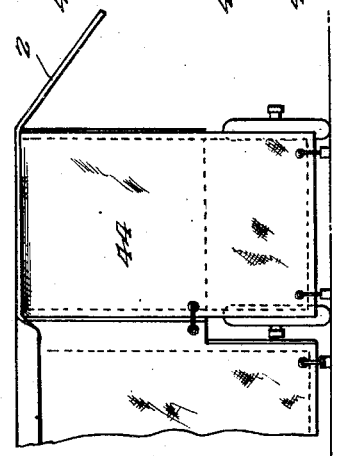
Inventor
W. A. Frisby.
By Lacey & Lacey, Attorneys Patented Sept. 29, 1931

1,825,183

UNITED STATES PATENT OFFICE

WILLIAM A. FRISBY, OF HOUSTON, TEXAS

TOURIST'S OUTFIT

Application filed January 3, 1930. Serial No. 418,343.

This invention is an outfit for camping tourists which may be easily set up at the side of an automobile for use as a room in daylight and readily converted into a bed chamber at night. The invention seeks to provide a collapsible combined tent and bed which may be manufactured as one complete article of such form that it may be spread upon the ground preliminary to being set up for use so that all the parts may be disposed in proper relation and then with minimum labor disposed in position for use. In one form of the device, a room may be provided at each side of an automobile which may be utilized as the central support for the roof and as the innermost wall for each room and one wall of the room may be quickly converted into a bed at night. In another form of the invention, only one room is provided but the automobile is utilized as the inner wall of that room and the roof of the room is extended over the automobile and secured beyond the same. The invention is illustrated in the accompanying drawings and will be hereinafter fully set forth and defined.

In the drawings:

Figure 1 is an elevation of the apparatus set up for use, the automobile being shown in front elevation and one room being shown in side elevation while at the opposite side of the automobile is shown the device arranged as a bed, Fig. 2 is an elevation looking at the outer end of the set up device, Fig. 3 is a top plan view, Fig. 4 is an enlarged sectional elevation of the outfit arranged for use as a room, Fig. 5 is an enlarged sectional elevation showing the arrangement of the device for use as a bed, Figs. 6 and 7 are detail sections through the fabric structure, Fig. 8 is a detail perspective view showing a portion of the securing cable and its cooperating guides, Fig. 9 is a plan view of the bed frame, Figs. 10 and 11 are sectional views of the bed rails and braces, Fig. 12 is a similar view of the central brace, Fig. 13 is an elevation of a modified form of the invention, Figure 14 is a rear elevation, and Figs. 15 and 16 are respectively inside and outside elevations of a window construction.

In the drawings, the reference numeral 1 indicates an automobile which may be of any well known structure. The camping outfit is designed to provide a tent containing a bed which bed may be utilized as one side of the tent in daylight hours and the structure includes a central strip of stout canvas or other similar material, indicated at 2, which is of sufficient length to extend over the top of the automobile and to both sides of the same, as will be understood upon reference to Figs. 1 and 13. In the preferred form of the invention, side members are secured to the roof section 2 at each side edge of the same so as to extend from the ends thereof toward the center whereby side walls will be provided when the apparatus is set up extending from the ends of the tent to points immediately adjacent the automobile. As shown at 3, a drop curtain may be secured to the roof structure to depend therefrom adjacent the side of the automobile to protect the occupants from insects and from ground dampness by being drawn under the beds when arranged for sleeping. The side wings or extensions are secured to the roof along the side edges of the same by one or more rows of stitching and a strip, such as 4, is also secured along the side edges of the roof to depend from the roof over the outside of the side members or wings and constitute eaves to shed rain and avoid the entrance of the same through the seam whereby the sides are connected to the roof. Each side comprises a wall portion 5 and a door portion 6, said door portion 6 being preferably fitted with screen cloth, as indicated at 7, whereby ventilation is attained and the entrance of insects and other pests is prevented. An outer door member or curtain 8 is secured to the upper edge of the side member and constitutes a storm door and also a closure for the device when it is utilized as sleeping quarters. The edges of the storm door 8 are provided with snap fastener elements, indicated at 9, adapted to cooperate with mating elements, indicated at 10, upon the main side member 5 so that the door or curtain may be securely closed in inclement weather. On the inside of the side wall are formed pockets, indicated at 11, for the reception of toilet articles or the like. It is also to be noted that the screen door 6 is reinforced by hems, indicated at 12, formed around its edges, and bracing strips 13 disposed across its surface vertically and horizontally, as shown most clearly in Fig. 4. Along the lower edge of the side members are rings or eyelets 14 which are to be engaged with tent pegs, indicated at 15, or connected with the pegs by short cables threaded through the eyes or rings and engaged with the pegs, as will be understood. A cross section of the bracing strips 13 is shown in Fig. 7, and it will be noted that the structure provides a central tubular portion 16 through which supporting ropes may be inserted if desired.

The outer end walls 17 are utilized as the beds at night and they are similar to the door section 6 in construction inasmuch as they have hollow hems 18 which correspond to the structure shown in Fig. 5. Through these hems are fitted the bed rails and braces shown most clearly in Figs. 9 to 12. Three rails are provided, two rails 19 being employed one at each side edge of the wall section 17 and one rail 20 being disposed logitudinally of said section at the center of the same, as will be understood upon reference to Fig. 2. Braces 21 are provided and these braces are fitted in the hems at the top and bottom of the sections 17 and serve to prevent collapse of the head and foot portions of the bed when the wall is swung into the position shown at the left in Fig. 1 for use as a bed. Each brace 21 consists of two bars having longitudinal recesses or notches formed in their meeting ends to accommodate a fulcrum plate 22, the ends of this plate being disposed obliquely so as to converge and the inner end walls of the recesses in the bars being likewise beveled, as shown in Fig. 11, the ends of the bars being pivoted to the plate, as shown at 23. The meeting ends of the bar are square and abutting at one side of the pivots but at the opposite side are convex and concentric with the pivots, as indicated at 24, at the opposite side so that the ends will abut in such manner that the bars can swing in only one direction. When the structures are arranged as beds, the several fulcrum plates will be disposed with their longer side edges upward. The load imposed on the bed tends to swing the ends of the rails and braces upward and is resisted by the abutting square end portions of the connected bars and the meeting oblique edges of the fulcrum plates and end walls of the notches in the bars, collapse being thereby prevented. When, however, it is desired to fold the device into a small compass, pressure is applied to the bars to turn them about their pivots toward the shorter side edge of the fulcrum plate. The ends of the braces 21 are reduced to form tenons 25 and through the extremities of these tenons are formed openings 26. The rail 20 also consists of two bars pivoted to a central fulcrum plate 27, corresponding in all respects to the plate 22 previously described, and said brace 20 is provided at its ends with reduced tongues or tenons 28 having large openings 29 formed therethrough. This structure permits the ends of the rail 20 to be engaged over the braces 21 and slid along the same to the centers thereof whereby the eyes 29 will encircle the joints in the braces, as shown in Fig. 9, and thereby lock the braces in their extended positions. The outer rails 19 also consist of two bars pivoted to a plate 30, corresponding in all essential respects to the plates 22 and 27, so that the rails may be collapsed when desired in the same manner as the center rail and the braces may be collapsed. The rails 19 are provided at their ends with openings 31 which may be engaged over the tenons 25 of the braces 21 and fit against the ends of the bars at the bases of the tenons so that the eyes or openings 26 will be disposed at the outer sides of the rails and, consequently, may be engaged over tent pegs, as shown at 32 in Fig. 2, or may have anchoring cables threaded therethrough. When the device is set up for use as a tent or room, the structures consisting of the canvas sections 17 and the braces and rails just described will be disposed vertically, as indicated in Figs. 1 and 2, and will be anchored at their lower edges by engagement with the tent pegs, as described. Cables 33 are extended through the hems 34 formed along the edges of the roof section and through the central channel 35 formed thereon according to the structure shown in Figs. 6 and 7, and these cables 33, of course, extend over the top of the automobile, as will be understood. The hems and channels 35 of the roof are filled with cotton or other cushioning material, as indicated at 36 in Fig. 6, so that when the cables 33 are drawn taut and caused to exert pressure upon the top of the automobile, damage to the top will be avoided. The central horizontal reinforcement 37 of the sections 17 is formed to provide a loop 38 at its center through which portions of the cables 33 may be engaged, as shown at 39 in Fig. 1, and the ends of said cables are then engaged around tent pegs 40 and drawn taut in the usual manner of tent building so that the sections 17 will be held upright while the device is used as a tent or room.

When the section 17 is to be utilized as a bed, the lower edge thereof is released from the tent pegs and it is then swung upwardly about the connection between the roof and its upper edge to the horizontal position shown in Fig. 1 at the left and in Fig. 5. The roof will by this action be brought into the downwardly inclined position shown in Fig. 1 and the side walls, of course, tend to collapse. The side walls, however, are released from the tent pegs and the lower portions of their sections 5 are then folded under the section 17 and the cables again drawn taut so that the folded side sections will constitute supports for the bed. As shown in Figs. 4 and 5, rings or similar elements 41 are provided at the upper ends of the door sections and supporting cables 42 are attached to said rings and carried under the inner end of the folded sections 17 and under the portions of the sides folded under said sections 17 and connected to the cables 33 to firmly support the inner end of the bed and the folded ends of the side walls. As shown in Fig. 5, the lower end of the curtain 3 may be folded under the bed and the folded side members and secured by cables so that the bed will be effectually supported.

In Fig. 13, there is shown a variation in which a single room at one side of the automobile is provided, the tent structure at the opposite side of the automobile being merely an extension of the roof and serving simply as additional anchoring or securing means. In this form of the invention, I show a curtain 43 which is attached to the roof 2 and may be extended down over the hood of the automobile power plant and secured thereto so as to enclose the front of the automobile and also serve to protect the same against inclement weather. In Fig. 14, there is shown a similar curtain 44 which may be brought down over the rear end of the automobile and secured so as to protect the rear of the vehicle.

The side of the tent shown in Fig. 13 may, of course, be identical in structure with the first described form, but I have illustrated said side as consisting of a single piece of fabric having an area equal to the entire area of the side and having a window opening 45 formed therein, a screen or netting 46 being secured within said opening, as shown and as will be understood. On the outer side of this side wall, a curtain 47 is secured along one edge just above the window opening and is adapted to drop down over the same to form a shutter and prevent the entrance of rain and other elements as well as to provide for the desired privacy at night. Above and below the window opening small openings 48 are provided through the side wall and cables 49 are strung through said openings, the cables being secured at intermediate points in their length to the lower free corners of the shutter 47 and having their ends disposed at the inner side of the side section so that by manipulating the cable within the room the curtain may be raised or lowered and secured in either the raised or lowered position.

When the device is to be transported or stored, the rails 19 and 20 and braces 21 are withdrawn from the section 17, after which the cables are released and the entire tent may be drawn from off the top of the automobile. It may then be very easily rolled into a compact bundle and may be secured upon the running board of the vehicle or otherwise disposed until its use is again desired. In setting up the device for use, the entire structure is first spread upon the ground with the side wings or walls and the end walls or wings extending flat from the roof section. The braces and rails having been fitted in the end wall sections, they are set up in vertical positions and braced by securing the cables, as will be understood. The automobile is then driven under the roof between the two rooms or at the side of the single room and will thereby serve as a further support for the tent while it is in use. The outfit can be provided at a low cost and may be very easily set up and taken down by unskilled labor.

The tent may be arranged as a three-room structure by using the bed and frames and braces as outside supports, drawing the three tie ropes sufficiently taut to support the drop curtains, and fastening the curtains to the ground, the automobile being thus left available for use.

Having thus described the invention, I claim:

1. A tent outfit comprising a roof section adapted to extend across the top of a touring vehicle and beyond the sides of the same, means for securing the ends of the roof section, fabric wall sections connected to the roof section to depend therefrom, means for holding one of said wall sections against collapse whereby it may form a support for the roof section, and means for suspending said section in a horizontal position from the roof whereby it may serve as a bed.

2. A tent outfit comprising a roof section, anchoring cables at the ends of the roof section, wall sections connected to the roof section at the side and end edges thereof, the end wall section having vertical and horizontal tubular members thereon, and interengaging bracing elements in the tubular members upon the end wall section.

3. A tent outfit comprising a fabric roof section adapted to extend across the top of a vehicle and beyond the sides thereof, channels extending from end to end of the roof section, cushioning material in said channels, anchoring cables extending through the channels and resting on the cushioning material, and wall sections secured to the roof section to depend therefrom.

4. A tent outfit comprising a fabric roof section, means for supporting and anchoring said section, an outer end wall fabric section secured at one end to the roof section, reinforcements on said end wall section whereby it may be held against collapse, said section being foldable about its connection with the roof to be disposed under the roof section to constitute a bed, side wall sections secured to the roof section and having their lower portions foldable under the end wall section when the latter is arranged as a bed and means whereby the side wall sections may be secured under the end section to support the latter as a bed.

5. A tent outfit comprising a fabric roof section, an end section attached thereto and having transverse and longitudinal hems, and rails and braces housed in said hems, said rails and braces each consisting of normally alined bars provided with longitudinal notches in their meeting ends, said ends being arcuate at one side edge and square at the opposite side edge, and a fulcrum plate having its ends fitted in the notches in the bars and pivoted to the bars, the ends of the plate converging toward one side edge thereof and the end walls of the notches in the bars being correspondingly disposed.

6. A tent outfit comprising a fabric roof section, an end section attached thereto and having transverse and longitudinal hems, rails and braces housed in said hems, said rails and braces each consisting of normally alined bars provided with longitudinal notches in their meeting ends, said ends being arcuate at one side edge and square at the opposite side edge, and a fulcrum plate having its ends fitted in the notches in the bars and pivoted to the bars, the ends of the plates converging toward one side edge thereof and the end walls of the notches in the bars being correspondingly disposed, and the ends of the rails being interengaged with the braces.

7. A tent outfit comprising a fabric roof section, an end section attached thereto and having transverse and longitudinal hems, rails and braces housed in said hems, said rails and braces each consisting of normally alined bars provided with longitudinal notches in their meeting ends, said ends being arcuate at one side edge and square at the opposite square edge, and a fulcrum plate having its ends fitted in the notches in the bars and pivoted to the bars, the ends of the plates converging toward one side edge thereof and the end walls of the notches in the bars being correspondingly disposed, the ends of the rails having openings through which the braces may pass and the ends of the lower rails having openings therethrough to receive anchoring elements.

In testimony whereof I affix my signature.

WILLIAM A. FRISBY. [L. S.]